United States Patent
Lei et al.

(10) Patent No.: US 11,163,856 B2
(45) Date of Patent: Nov. 2, 2021

(54) OFFLINE LICENSE ACTIVATION FOR BARCODE DECODERS

(71) Applicant: The Code Corporation, Draper, UT (US)

(72) Inventors: Ming Lei, Princeton Junction, NJ (US); Anuj Sajit Shah, Brookline, MA (US)

(73) Assignee: The Code Corporation, Murray, UT (US)

( * ) Notice: Subject to any disclaimer, the term of this patent is extended or adjusted under 35 U.S.C. 154(b) by 166 days.

(21) Appl. No.: 16/161,945

(22) Filed: Oct. 16, 2018

(65) Prior Publication Data

US 2019/0114398 A1 Apr. 18, 2019

Related U.S. Application Data

(60) Provisional application No. 62/573,319, filed on Oct. 17, 2017.

(51) Int. Cl.
| | |
|---|---|
| *G06Q 20/38* | (2012.01) |
| *G06F 21/10* | (2013.01) |
| *G06F 21/12* | (2013.01) |
| *G06K 19/06* | (2006.01) |
| *G06K 7/10* | (2006.01) |
| *G06F 16/28* | (2019.01) |

(52) U.S. Cl.
CPC ......... *G06F 21/105* (2013.01); *G06F 16/288* (2019.01); *G06F 21/12* (2013.01); *G06K 7/10544* (2013.01); *G06K 19/06028* (2013.01); *G06F 2221/0704* (2013.01)

(58) Field of Classification Search
CPC ................................................ G06Q 2220/18
USPC .......................................................... 705/59
See application file for complete search history.

(56) References Cited

U.S. PATENT DOCUMENTS

| | | | |
|---|---|---|---|
| 9,646,332 B2 * | 5/2017 | Zheng | G06F 21/105 |
| 2005/0102240 A1 * | 5/2005 | Misra | G06Q 30/0633 |
| | | | 705/59 |
| 2015/0013015 A1 * | 1/2015 | Zheng | G06F 21/105 |
| | | | 726/27 |
| 2018/0218466 A1 * | 8/2018 | Mowatt | G06Q 50/184 |

* cited by examiner

*Primary Examiner* — Chinedu C Agwumezie
(74) *Attorney, Agent, or Firm* — Timothy P. O'Hagan; Ray Quinney & Nebeker

(57) ABSTRACT

A system in accordance with the present disclosure may include a plurality of electronic devices that do not have Internet connectivity. Each electronic device may include a barcode decoder and a license activation application. The system may also include a computing device that has an Internet connection. The computing device may include a master program that is executable to obtain a plurality of identifiers from the plurality of electronic devices. The master program may also be executable to send at least one license request to a license server via the Internet connection. The at least one license request may include the plurality of identifiers. The master program may also be executable to receive a plurality of licenses from the license server in response to the at least one license request. The master program may also be executable to provide the plurality of licenses to the plurality of electronic devices.

19 Claims, 11 Drawing Sheets

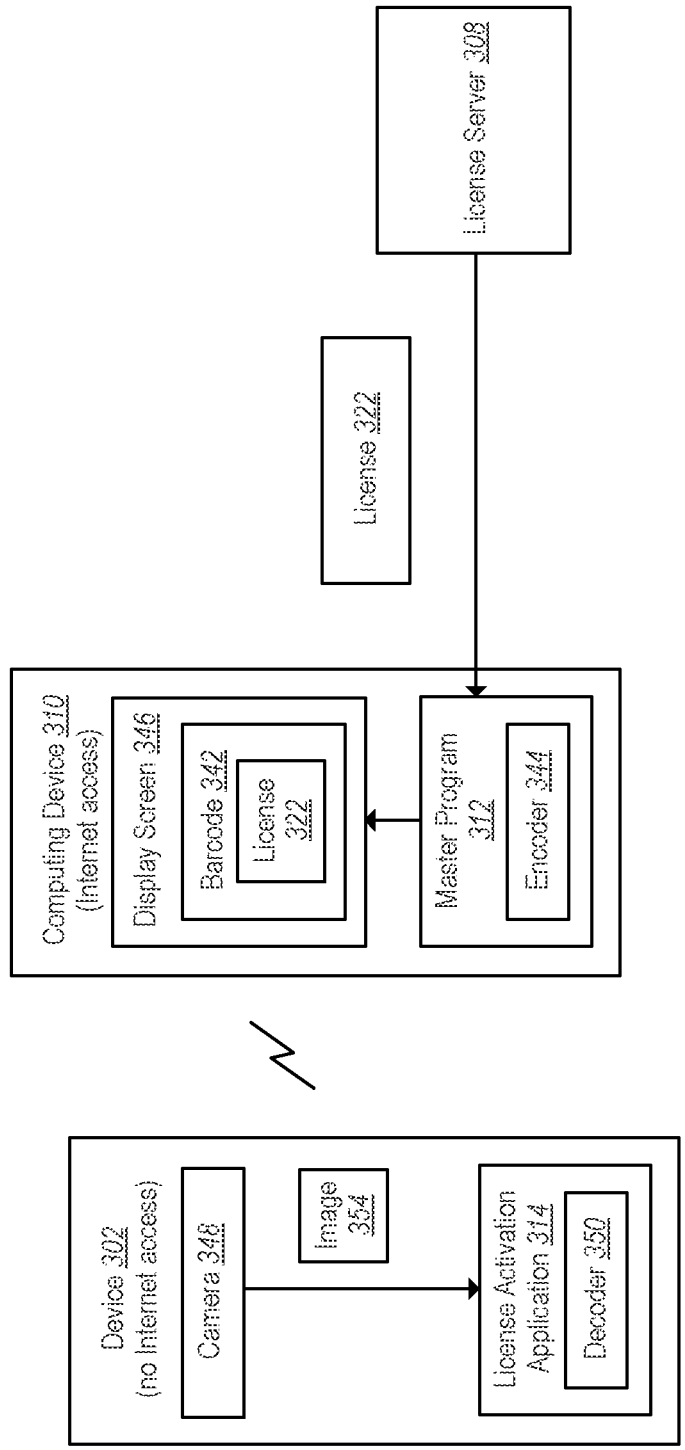

OFFLINE LICENSE ACTIVATION FOR BARCODE DECODERS

CLAIM OF PRIORITY

This application claims the benefit of U.S. Provisional Patent Application No. 62/573,319 titled "Offline License Activation for Barcode Decoders," filed Oct. 17, 2017, with inventors Ming Lei and Anuj Sajit Shah, which is incorporated herein by reference in its entirety.

BACKGROUND

A barcode is an optical machine-readable representation of information. Devices for identifying or extracting information from barcodes are generally referred to as barcode readers or barcode scanners. An image-based barcode reader includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode.

A barcode decoder may be configured so that it will not operate at all, or will operate at a reduced level of functionality, without a license. A license may be obtained from a license server. Some devices, however, may not have access to the Internet. Therefore, such devices cannot directly obtain a license from the license server.

SUMMARY

A system in accordance with the present disclosure may include a plurality of electronic devices that do not have Internet connectivity. Each electronic device may include a barcode decoder and a license activation application. The system may also include a computing device that has an Internet connection. The computing device may include a master program that is executable to obtain a plurality of identifiers from the plurality of electronic devices. The master program may also be executable to send at least one license request to a license server via the Internet connection. The at least one license request may include the plurality of identifiers. The master program may also be executable to receive a plurality of licenses from the license server in response to the at least one license request. The master program may also be executable to provide the plurality of licenses to the plurality of electronic devices.

Each license may be associated with an electronic device. Each license may enable operation of the barcode decoder on the electronic device or facilitate enhanced functionality for the barcode decoder on the electronic device.

The plurality of identifiers may be obtained at different times. In some embodiments, the master program may additionally be configured to store the plurality of identifiers and send the plurality of identifiers to the license server together as a group. Alternatively, the master program may additionally be configured to send a license request to the license server whenever an identifier is received from an electronic device.

The master program may additionally be configured to create one or more data structures that indicate relationships between the plurality of identifiers and the plurality of licenses. The master program may additionally be configured to store the one or more data structures in storage that is accessible to the computing device.

In some embodiments, the master program may additionally be configured to receive a license activation request from an electronic device. The license activation request may include an identifier that uniquely identifies the electronic device. The master program may additionally be configured to access one or more data structures that indicate relationships between the plurality of identifiers and the plurality of licenses. The master program may additionally be configured to identify, via the one or more data structures, a license that corresponds to the identifier. The master program may additionally be configured to provide the license to the electronic device.

In some embodiments, the master program may additionally be configured to obtain an identifier from an electronic device by reading a first barcode that is displayed on the electronic device. The master program may additionally be configured to provide a license to the electronic device by generating a second barcode that comprises the license and displaying the second barcode.

A computer-readable medium in accordance with the present disclosure may include computer-executable instructions stored thereon that, when executed, cause one or more processors on a computing device to perform various operations. The operations may include obtaining a plurality of identifiers from a plurality of electronic devices that do not have Internet connectivity. The operations may also include sending at least one license request to a license server via an Internet connection. The at least one license request may include the plurality of identifiers. The operations may also include receiving a plurality of licenses from the license server in response to the at least one license request. The operations may also include providing the plurality of licenses to the plurality of electronic devices.

Each electronic device may include a barcode decoder. Each license may enable operation of the barcode decoder or facilitate enhanced functionality for the barcode decoder. Each identifier may uniquely identify an electronic device.

The plurality of identifiers may be obtained at different times. In some embodiments, the operations may further include storing the plurality of identifiers and sending the plurality of identifiers to the license server together as a group. Alternatively, the operations may further include sending a license request to the license server whenever an identifier is received from an electronic device.

In some embodiments, the operations may further include creating one or more data structures that indicate relationships between the plurality of identifiers and the plurality of licenses. The operations may further include storing the one or more data structures in storage that is accessible to the computing device.

In some embodiments, the operations may further include receiving a license activation request from an electronic device. The license activation request may include an identifier that uniquely identifies the electronic device. The operations may further include accessing one or more data structures that indicate relationships between the plurality of identifiers and the plurality of licenses. The operations may further include identifying, via the one or more data structures, a license that corresponds to the identifier. The operations may further include providing the license to the electronic device.

In some embodiments, the operations may further include obtaining an identifier from an electronic device by reading a first barcode that is displayed on the electronic device. The operations may further include providing a license to the electronic device by generating a second barcode that comprises the license and displaying the second barcode.

A computer-readable medium in accordance with the present disclosure may include computer-executable instructions stored thereon that, when executed, cause one or more processors on an electronic device that does not have Internet connectivity to perform various operations. The operations may include receiving user input that includes an instruction to activate a barcode decoder on the electronic device. The operations may additionally include providing, in response to the user input, an identifier to a computing device that has an Internet connection. The identifier may uniquely identify the electronic device. The operations may additionally include obtaining a license from the computing device. The operations may additionally include using the license to activate the barcode decoder. Activating the barcode decoder may include at least one of enabling operation of the barcode decoder or facilitating enhanced functionality for the barcode decoder.

In some embodiments, obtaining the license from the computing device may include sending a license activation request to the computing device. The license activation request may include the identifier.

In some embodiments, providing the identifier to the computing device may include generating a first barcode that comprises the identifier and displaying the first barcode. Obtaining the license from the computing device may include reading a second barcode that is displayed on the computing device. The second barcode may include the license.

In some embodiments, the user input may include first user input including a first instruction to provide the identifier to the computing device and second user input including a second instruction to obtain the license for the barcode decoder. The identifier may be provided to the computing device in response to the first user input. The license may be obtained from the computing device in response to the second user input.

BRIEF DESCRIPTION OF THE DRAWINGS

FIGS. 3A and 3B illustrate an example of a system in which an electronic device (i) provides an identifier to a master program on another computing device by generating a barcode that includes the identifier, and (ii) receives a license from the master program by reading a barcode that includes the license.

DETAILED DESCRIPTION

The present disclosure is generally related to activating a barcode decoder on a plurality of electronic devices that do not have Internet connectivity. In this context, the term "activate" may refer to enabling operation of a barcode decoder on an electronic device and/or facilitating enhanced functionality for the barcode decoder.

In accordance with the present disclosure, a computing device that is connected to the Internet may obtain licenses from a license server on behalf of the plurality of electronic devices. For example, the computing device may obtain an identifier from each of the plurality of electronic devices. The identifier that is obtained from a particular electronic device may uniquely identify that electronic device. The computing device may send the identifiers that are obtained from the plurality of electronic devices to a license server via an Internet connection. In response to receiving the identifiers, the license server may create a plurality of licenses and send the plurality of licenses to the computing device. Each license may be associated with a particular electronic device. The license associated with a particular electronic device may enable operation of the barcode decoder on that electronic device or facilitate enhanced functionality for the barcode decoder on that electronic device. In response to receiving the plurality of licenses from the license server, the computing device may provide the plurality of licenses to the plurality of electronic devices.

The techniques disclosed herein may be used to activate a barcode decoder on many different types of electronic devices. Some examples of electronic devices to which the techniques disclosed herein may be applicable include portable hand-held computing devices (e.g., smartphones and other types of mobile computing devices), tablet computers, dedicated barcode readers, laptop computers, desktop computers, and Internet of Things (IoT) devices.

Figure 1A:
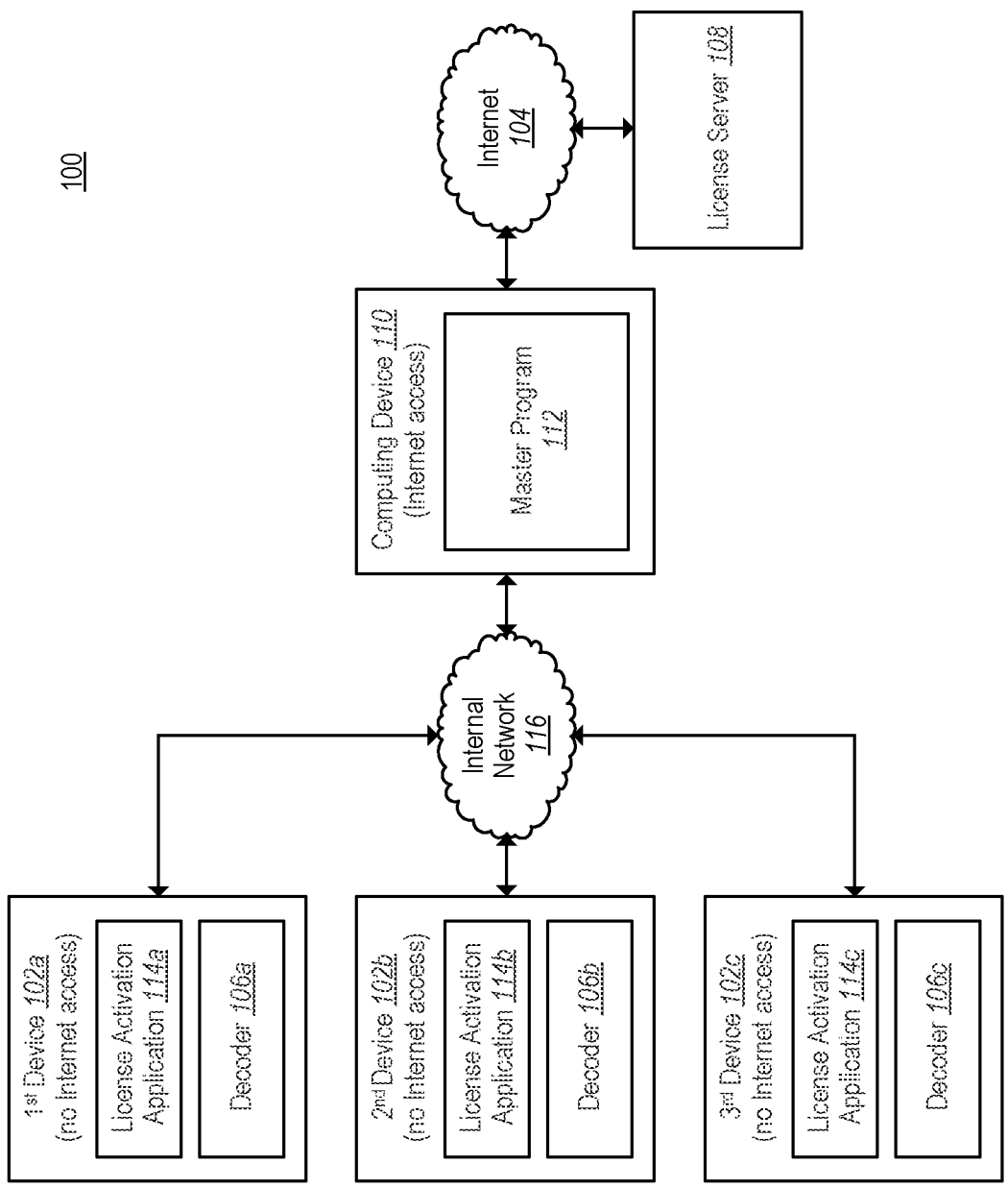
FIGS. 1A-1D illustrate an example of a system that is configured to facilitate activation of a barcode decoder on a plurality of electronic devices that do not have Internet connectivity.

FIGS. 1A-1D illustrate an example in accordance with the present disclosure. Reference is initially made to FIG. 1A, which illustrates a system 100 that includes a plurality of electronic devices 102a-c including a first electronic device 102a, a second electronic device 102b, and a third electronic device 102c. The electronic devices 102a-c may be referred to herein simply as devices 102a-c. For simplicity, only three devices 102a-c are shown in FIGS. 1A-1D. However, the techniques disclosed herein are applicable to systems that include a large number (e.g., hundreds or thousands) of devices.

The devices 102a-c each include a barcode decoder, which may be referred to herein simply as a decoder. More specifically, the first device 102a is shown with a first decoder 106a, the second device 102b is shown with a second decoder 106b, and the third device 102c is shown with a third decoder 106c. The decoder on a particular device may be configured so that it will not operate at all, or will operate at a reduced level of functionality, without a license. A license may be obtained from a license server 108. The devices 102a-c, however, do not have access to the Internet 104. Therefore, the devices 102a-c cannot directly obtain a license from the license server 108.

To simplify the process of obtaining licenses for the devices 102a-c, a license activation application 114 may be installed on each of the devices 102a-c. The first device 102a is shown with a first license activation application 114a, the second device 102b is shown with a second license activation application 114b, and the third device 102c is shown with a third license activation application 114c.

In some implementations, the license applications 114a-c may be separate from the decoders 106a-c to be licensed. In other words, the license applications 114a-c and the decoders 106a-c may be separate applications. Alternatively, the license applications 114a-c may be integrated into the decoders 106a-c to be licensed. For example, referring to the first device 102a, the license activation application 114a may be integrated into the decoder 106a.

To obtain licenses for the devices 102a-c, the license activation applications 114a-c may communicate with a master program 112. The master program 112 may be running on a computing device 110 that has access to the Internet 104 and that is capable of communicating with or obtaining information from the devices 102a-c. For example, the computing device 110 may be in electronic communication with the devices 102a-c via an internal network 116. The internal network 116 may be, for example, a local area network (LAN), a wireless LAN (e.g., Wi-Fi), or the like.

Figure 1B:
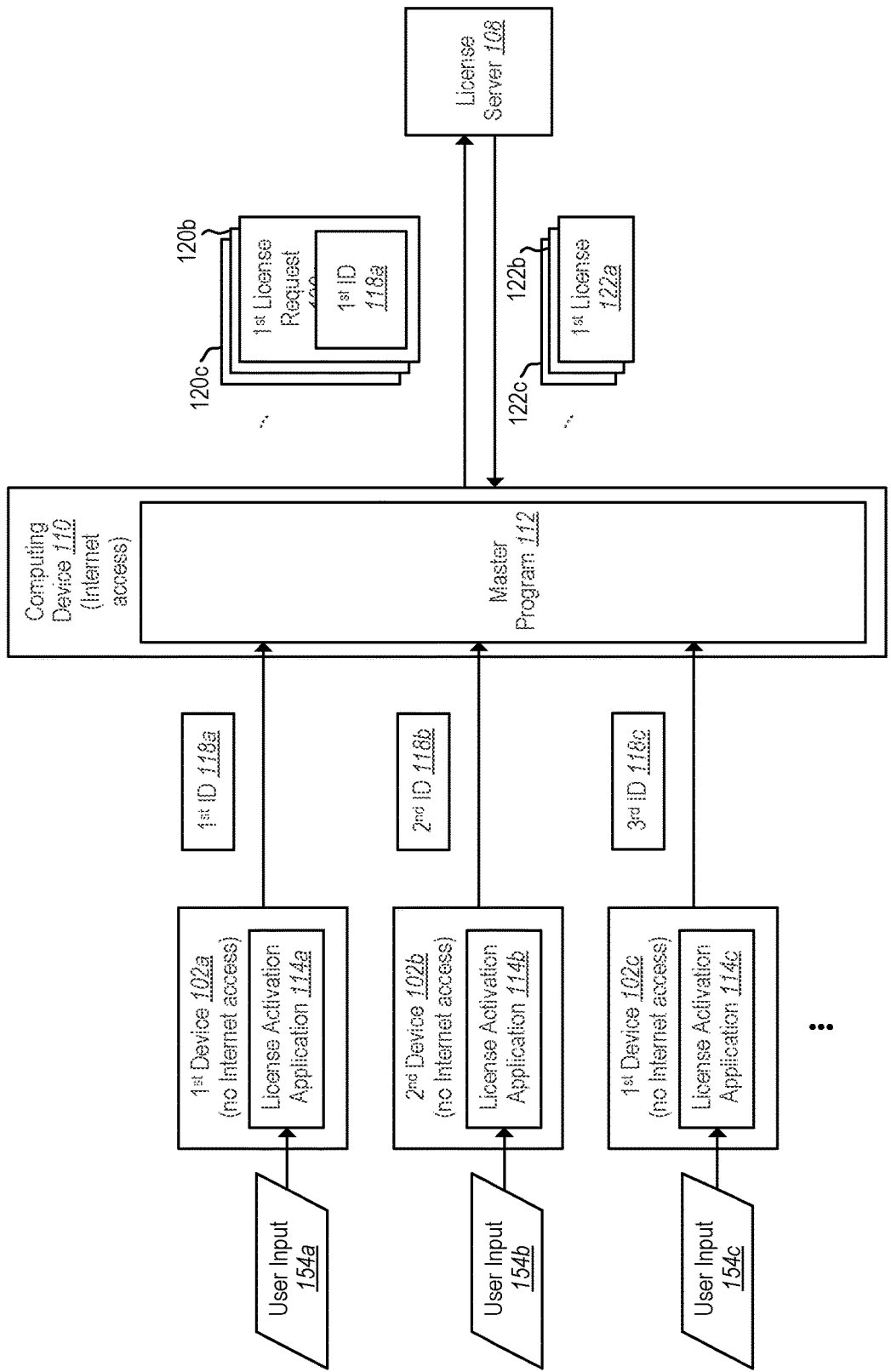

Reference is now made to FIG. 1B. The master program 112 may be configured to obtain identifiers 118a-c from the devices 102a-c. For example, the license activation application on a particular device may send an identifier (ID) to the master program 112 via the internal network 116. FIG. 1B shows the license activation application 114a on the first device 102a sending a first ID 118a to the master program 112, the license activation application 114b on the second device 102b sending a second ID 118b to the master program 112, and the license activation application 114c on the third device 102c sending a third ID 118c to the master program 112.

The ID sent by a particular device may uniquely identify that device, either globally or within the context of the system 100. For example, the ID sent by a particular device may be a medium access control (MAC) ID or another globally unique ID associated with that device. Alternatively, IDs may be assigned to devices 102a-c by the master program 112 or by another entity associated with the system 100.

Each license activation application 114a-c may be configured to send an ID to the master program 112 in response to user input. For example, each license activation application 114a-c may include a "Send ID" button, and may be configured to send an ID to the master program 112 in response to the user pressing this button. FIG. 1B shows the license activation application 114a on the first device 102a providing a first ID 118a to the master program 112 in response to first user input 154a, the license activation application 114b on the second device 102b providing a second ID 118b to the master program 112 in response to second user input 154b, and the license activation application 114c on the third device 102c providing a third ID 118c to the master program 112 in response to third user input 154c.

The master program 112 may receive the IDs 118a-c from the devices 102a-c and send one or more license requests 120a-c to a license server 108 via the connection to the Internet 104. Each of the license requests 120a-c may include an ID for a device. For example, the master program 112 may send a first license request 120a that includes a first ID 118a corresponding to the first device 102a, a second license request 120b that includes a second ID 118b corresponding to the second device 102b, a third license request 120c that includes a third ID 118c corresponding to the third device 102c, and so on.

The IDs 118a-c may be received from the devices 102a-c at different times. In some embodiments, the master program 112 may be configured to store the IDs 118a-c and send the IDs 118a-c to the license server 108 together as a group. The 118a-c may be stored on the computing device 110 or in another location that is accessible to the computing device 110. The IDs 118a-c may be sent to the license server 108 at a point in time at which doing so will be least burdensome to the overall system 100 (e.g., after normal business hours, in the middle of the night). Alternatively, the master program 112 may be configured to send a license request to the license server 108 whenever an ID is received from a device 102.

In the depicted example, the master program 112 is shown sending multiple license requests 120a-c to the license server 108. These license requests 120a-c may be sent at the same time, or at different times. Alternatively, instead of sending multiple license requests 120a-c, the master program 112 may be configured to send the license server 108 a single license request that includes multiple IDs 118a-c.

Whether the master program 112 sends a plurality of license requests 120a-c or just a single license request, the master program 112 may receive a plurality of licenses 122a-c in response to the license request(s). In response to receiving a license request corresponding to a particular device, the license server 108 may create a license for that device and send the license back to the master program 112. Alternatively, the license may already be created and stored in memory, and the license server 108 may simply retrieve the license from memory and send it back to the mater program 112 in response to receiving the license request.

The license associated with a particular device may be anything that can be used to activate the barcode decoder on that device (e.g., anything that enables operation of the decoder on that device and/or facilitates enhanced functionality for the decoder on that device). For example, the license associated with a particular device may be a license key (e.g., a sequence of alphanumeric characters) for the decoder. As another example, the license may be a license file that includes a license key.

Figure 1C:
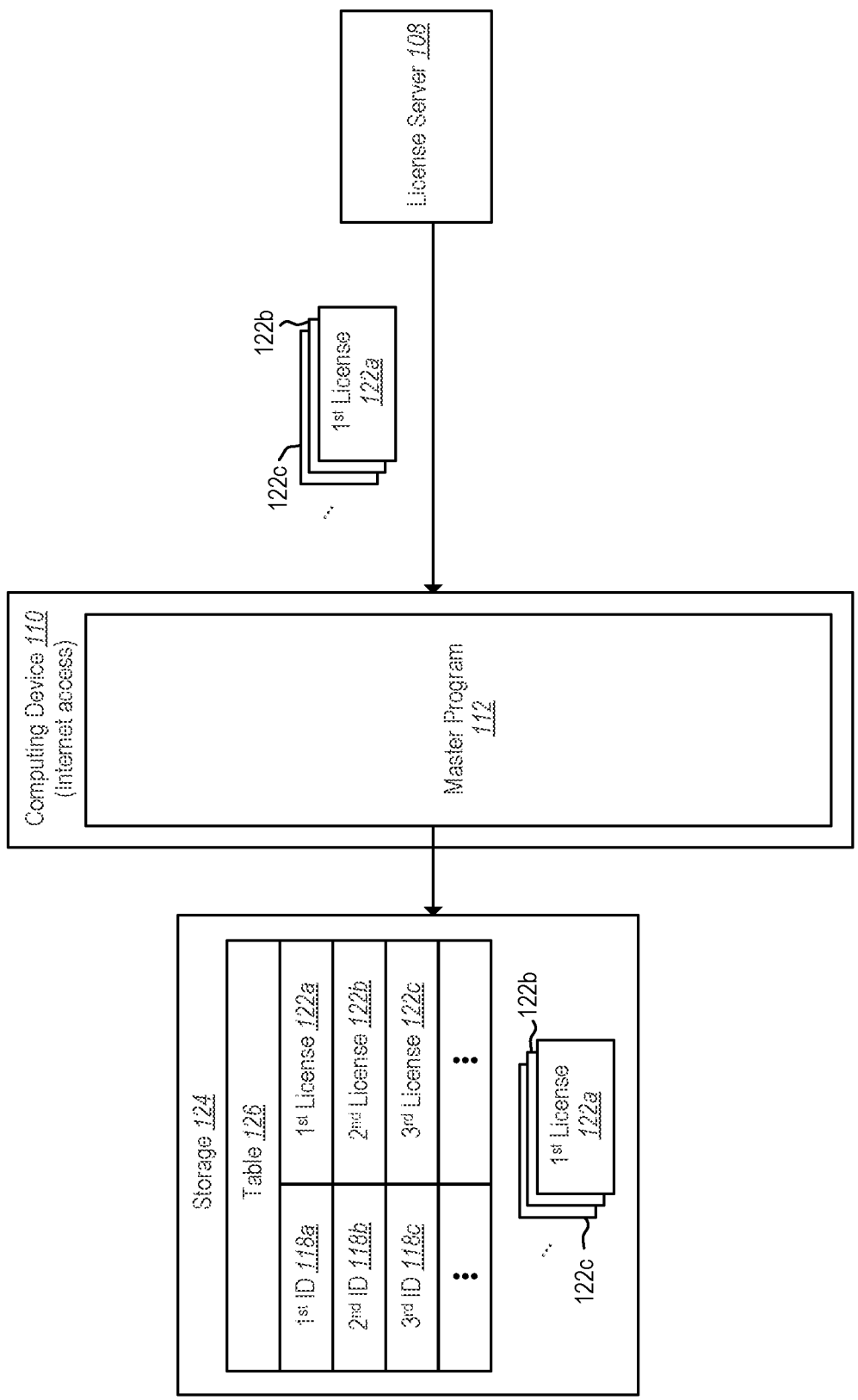
Figure 1D:
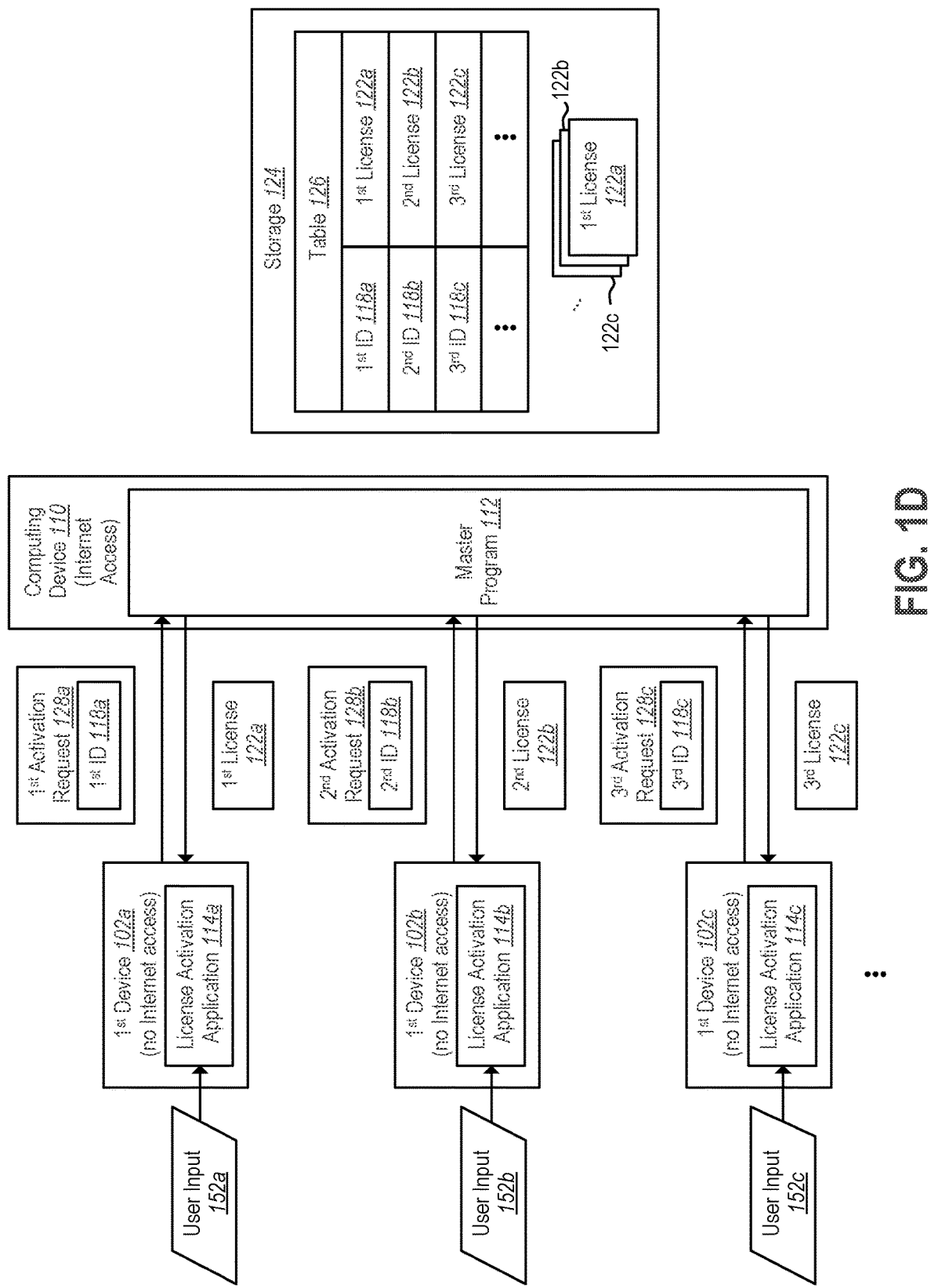

As shown in FIG. 1D, the license server 108 may send the master program 112 a first license 122a for the first device 102a, a second license 122b for the second device 102b, a third license 122c for the third device 102c, and so on. The first license 122a may enable operation of the decoder 106a on the first device 102a or facilitate enhanced functionality for the decoder 106a on the first device 102a. The second license 122b and the third license 122c may operate similarly with respect to the decoder 106b on the second device 102b and the decoder 106c on the third device 102c, respectively.

Reference is now made to FIG. 1C. The master program 112 may provide the plurality of licenses 122a-c to the plurality of electronic devices 102a-c. For example, the master program 112 may store the licenses 122a-c that it receives from the license server 108 in storage 124 that is accessible to the computing device 110. The storage 124 may be internal or external to the computing device 110. In some embodiments, the storage 124 may include non-volatile storage. The master program 112 may also create one or more data structures, such as a table 126, that indicate relationships between licenses 122a-c and device IDs 118a-c. In the table 126 shown in FIG. 1C, the first license 122a is associated with the first ID 118a (which uniquely identifies the first device 102a), the second license 122b is associated with the second ID 118b (which uniquely identifies the second device 102b), and the third license 122c is associated with the third ID 118c (which uniquely identifies the third device 102c). Although just a single table 126 is shown in FIG. 1C, in an alternative embodiment multiple tables (or other data structures) may be created.

Reference is now made to FIG. 1D. Once the master program 112 has received the licenses 122a-c from the license server 108, the devices 102a-c may obtain the licenses 122*a-c* from the master program 112. For example, the devices 102*a-c* may request the licenses 122*a-c* from the master program 112. FIG. 1D shows the license activation application 114*a* on the first device 102*a* sending a first activation request 128*a* to the master program 112. The first activation request 128*a* may include the first ID 118*a*, which uniquely identifies the first device 102*a*. In response to receiving the first activation request 128*a*, the master program 112 may access one or more data structures that indicate relationships between IDs 118*a-c* and licenses 122*a-c*. In the depicted example, the master program 112 may access the table 126. The master program 112 may identify, via the table 126 (and/or other data structures), a license 122*a* that corresponds to the first ID 118*a*. The master program 112 may then provide the identified license 122*a* to the device 102*a* (e.g., by sending the license 122*a* to the first device 102*a*).

Other devices may obtain their licenses in a similar manner. For example, the license activation application 114*b* on the second device 102*b* may send a second activation request 128*b* (including the second ID 118*b*) to the master program 112, and receive the second license 122*b* back from the master program 112. The license activation application 114*c* on the third device 102*c* may send a third activation request 128*c* (including the third ID 118*c*) to the master program 112, and receive the third license 122*c* back from the master program 112.

The license activation application may send an activation request to the master program 112 in response to user input. For example, the license activation application may include an "Activate" button, and the license activation application may send an activation request to the master program 112 in response to the user pressing this button. FIG. 1D shows the license activation application 114*a* on the first device 102*a* sending a first activation request 128*a* to the master program 112 in response to first user input 152*a*, the license activation application 114*b* on the second device 102*b* sending a second activation request 128*b* to the master program 112 in response to second user input 152*b*, and the license activation application 114*c* on the third device 102*c* sending a third activation request 128*c* to the master program 112 in response to third user input 152*c*. The master program 112 returns the licenses 122*a-c* for the devices 102*a-c* in response to the various activation requests 128*a-c*. Thus, the licenses 122*a-c* are obtained from the master program 112 in response to the user inputs 152*a-c*.

The user inputs received by a particular device may be interpreted as including an instruction to activate a decoder on that device. For example, FIG. 1B shows the license activation application 114*a* on the first device 102*a* receiving user input 154*a* that includes an instruction to provide the first ID 118*a* to the master program 112 on the computing device 110. FIG. 1D shows the first device 102*a* receiving user input 152*a* that includes an instruction to obtain the license 122*a* for the decoder 106*a* on the first device 102*a*. Either or both of these user inputs 152*a*, 154*a* may be interpreted as an instruction to activate the decoder 106*a* on the first device 102*a*. Once the first device 102*a* has obtained the license 122*a*, the first device 102*a* may use the license 122*a* to activate the decoder 106*a*.

Figure 2:
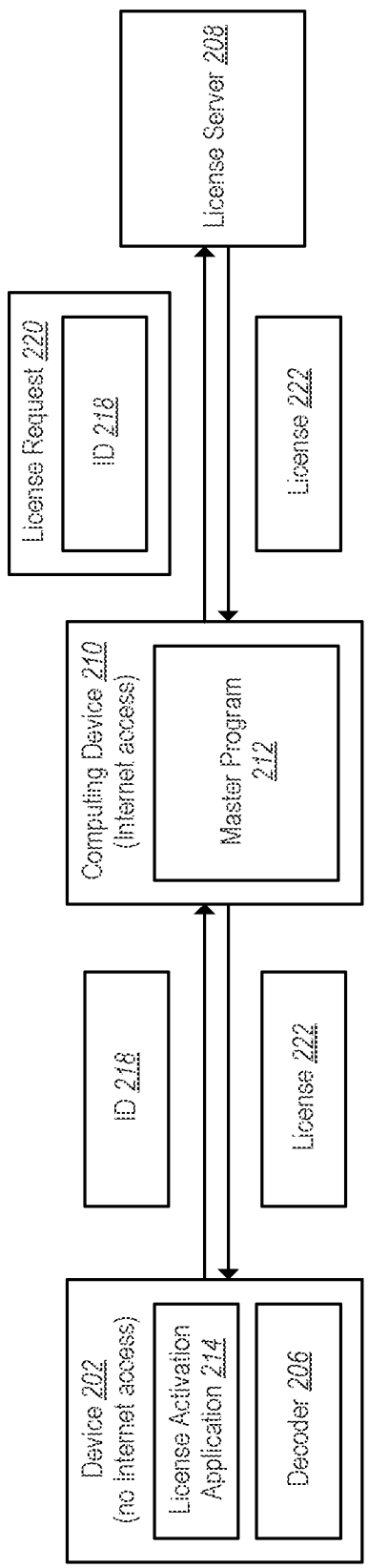
FIG. 2 illustrates an example of a system in which a license request is sent whenever an identifier is received from an electronic device.

FIG. 2 illustrates another example in accordance with the present disclosure. This example may involve a system that is similar to the system 100 shown in FIGS. 1A-D. In this example, however, the master program 212 on the Internet-connected computing device 210 may send a license request 220 to the license server 208 whenever an ID 218 is received from a device 202. For example, the master program 212 may send a license request 220 to the license server 208 immediately (or soon) after receiving an ID 218 from a device 202 that does not have access to the Internet 104 (instead of waiting to collect IDs 118*a-c* from a plurality of devices 102*a-c*, as discussed above in the example shown in FIGS. 1A-D). In response to receiving the license request 220, the license server 208 may generate a license 222 for the corresponding device 202 (i.e., the device 202 that is uniquely identified by the ID 218 in the license request 220) and send the license 222 back to the master program 212. The master program 212 may then send the license 222 back to the license activation application 214 on the device 202. The license 222 may enable operation of the decoder 206 on the device 202 or facilitate enhanced functionality for the decoder 206 on the device 202.

Figure 3A:
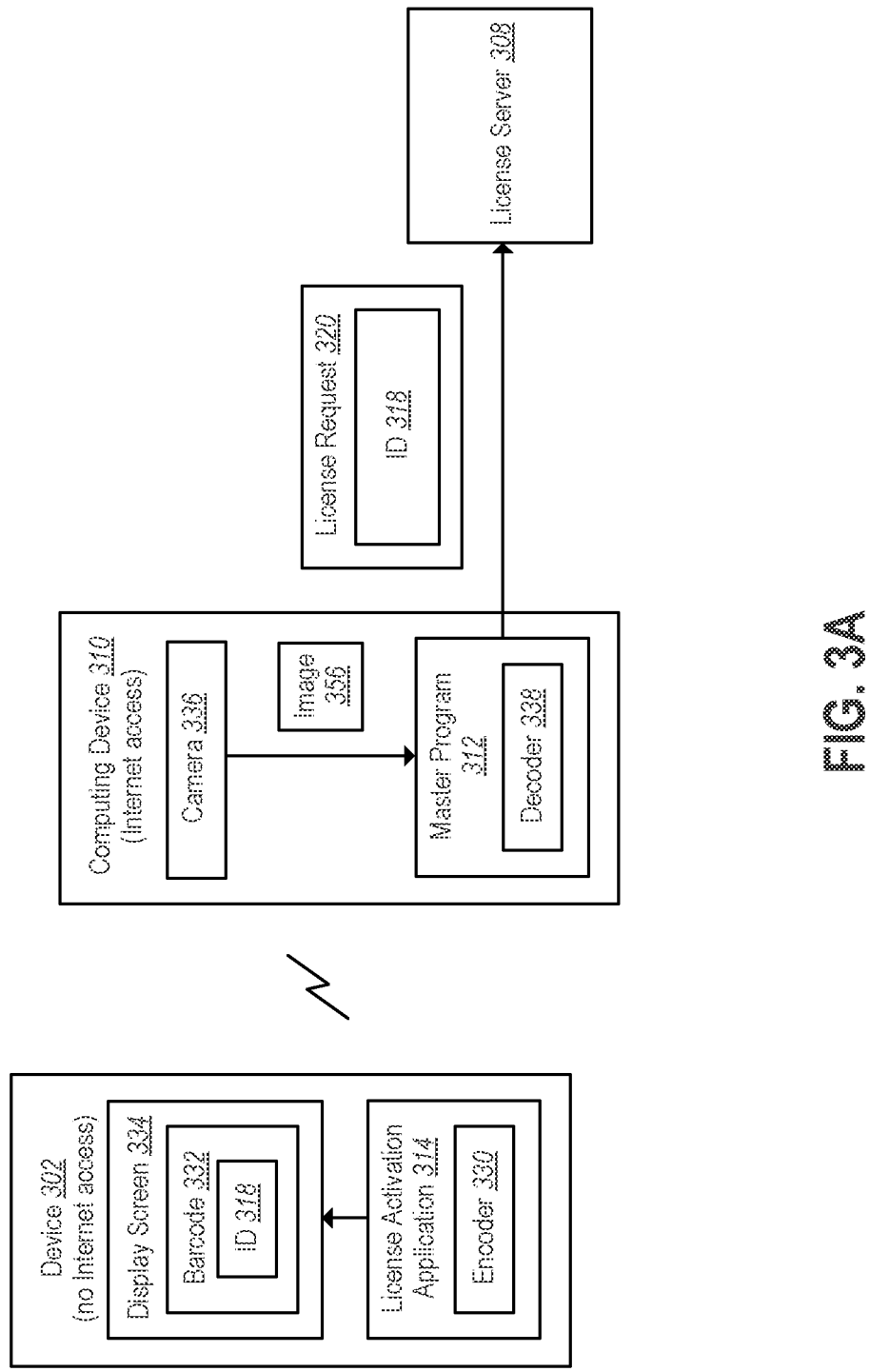

FIGS. 3A-B illustrate another example in accordance with the present disclosure. Reference is initially made to FIG. 3A. As before, a device 302 that does not have Internet access may include a license activation application 314. The license activation application 314 may be configured to provide an ID 318 to a master program 312 on a computing device 310. In this example, however, the license activation application 314 may be configured to provide the ID 318 to the master program 312 by generating a barcode 332 that includes the ID 318 and displaying the barcode 332 on a display screen 334 of the device 302. The license activation application 314 is shown with an encoder 330 for providing this functionality.

Another computing device 310 (e.g., a mobile device, such as a smartphone) that has Internet access may obtain the ID 318 from the device 302 by reading the barcode 332 that is displayed on the display screen 334 of the device 302. For example, the computing device 310 may include a camera 336, which may be used to capture an image 356 of the barcode 332 (more specifically, an image 356 of the display screen 334 of the device 302, which includes the barcode 332). The computing device 310 may also include a decoder 338, which may be part of the master program 312. The decoder 338 may process the image 356 of the barcode 332 in order to decode the barcode 332, thereby obtaining the ID 318.

In response to obtaining the ID 318, the master program 312 may send a license request 320 to the license server 308. The license request 320 may include the ID 318 that identifies the device 302.

Reference is now made to FIG. 3B. In response to receiving the license request 320, the license server 308 may generate a license 322 for the corresponding device 302 (i.e., the device 302 that is uniquely identified by the ID 318 in the license request 320) and send the license 322 back to the master program 312. The master program 312 may be configured to provide the license 322 to the device 302 by generating a barcode 342 that includes the license 322. The master program 312 is shown with an encoder 344 for providing this functionality. The master program 312 may cause the barcode 342 to be displayed on a display screen 346 of the computing device 310.

The device 302 may obtain the license 322 from the master program 312 by reading the barcode 342 that is displayed on the display screen 346 of the computing device 310. For example, the device 302 may include a camera 348, which may be used to capture an image 354 of the barcode 342 (more specifically, an image 354 of the display screen 346 of the computing device 310, which includes the barcode 342). The device 302 may also include a decoder 350, which may be part of the license activation application 314.

The decoder 350 may process the image of the barcode 342 in order to decode the barcode 342, thereby obtaining the license 322.

Figure 4:
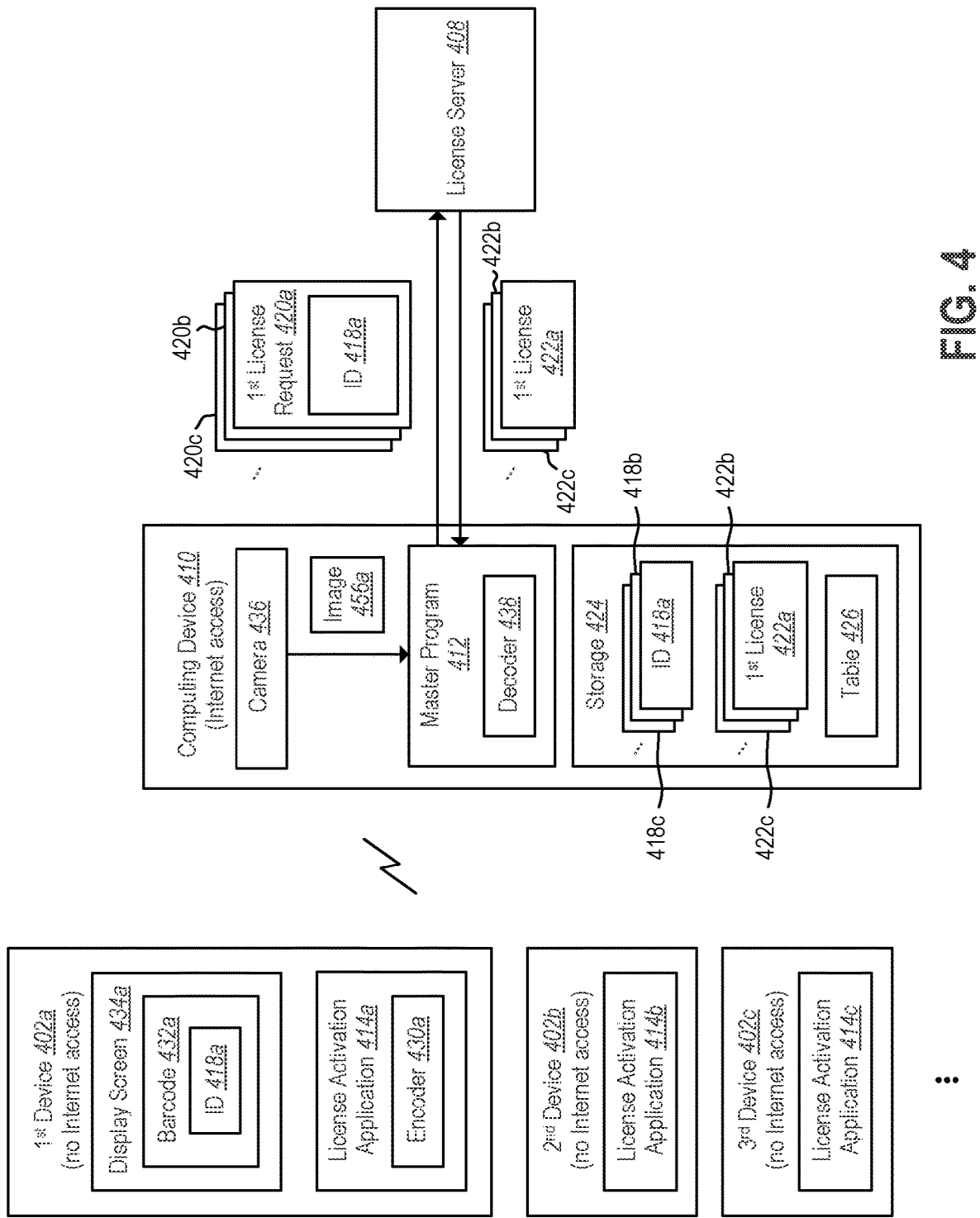
FIG. 4 illustrates an example of a system in which a plurality of electronic devices each provide an identifier to a master program on another computing device by generating a barcode that includes the identifier.

FIG. 4 illustrates another example in accordance with the present disclosure. In this example, a plurality of devices 402a-c that do not have access to the Internet each include a license activation application. In particular, FIG. 4 shows a first device 402a with a license activation application 414a, a second device 402b with a license activation application 414b, and a third device 402c with a license activation application 414c.

A computing device 410 that does include Internet access may collect IDs 418a-c from the devices 402 in a manner similar to the process described in FIGS. 3A-B. For example, the license activation application 414a may be configured to generate a barcode 432a that includes an ID 418a (e.g., a MAC ID) that uniquely identifies the first device 402a. The license activation application 414a is shown with an encoder 430a for providing this functionality. The license activation application 414a may cause the barcode 432a to be displayed on a display screen 434a of the first device 402a.

Another computing device 410 (e.g., a mobile device, such as a smartphone) that has Internet access may be used to read the barcode 432a that is displayed on the display screen 434a of the first device 402a. For example, the computing device 410 may include a camera 436, which may be used to capture an image 456a of the barcode 432a. The computing device 410 may also include a decoder 438, which may be part of the master program 412. The decoder 438 may process the image 456a in order to decode the barcode 432a, thereby obtaining the ID 418a.

The computing device 410 may collect IDs 418b, 418c from the second device 402b and the third device 402c using a similar process. The master program 412 may store the IDs 418a-c that it receives from the devices 402a-c in storage 424. Then, at a subsequent point in time (e.g., after normal business hours, in the middle of the night), the master program 412 may send license requests 420a-c to the license server 408. For example, the master program 412 may send a first license request 420a corresponding to the first device 402a, a second license request 420b corresponding to the second device 402b, a third license request 420c corresponding to the third device 402c, and so on.

The license server 408 may respond to each license request by generating a license and sending the license back to the master program 412. For example, the license server 408 may send the master program 412 a first license 422a for the first device 402a, a second license 422b for the second device 402b, a third license 422c for the third device 402c, and so on. The master program 412 may store the licenses 422a-c that it receives from the license server 408 in storage 424. The master program 412 may also create one or more data structures, such as a table 426, for storing the relationship between licenses 422a-c and device IDs 418a-c. The table 426 may be similar to the table 126 shown in FIGS. 1C-D.

The computing device 410 may distribute the licenses 422a-c to the devices 402a-c in a manner similar to the process described in connection with FIG. 1D. In particular, the devices 402a-c may request the licenses 422a-c from the master program 412. In response to receiving an activation request, the master program 412 may access the table 426 to determine which license corresponds to the ID in the activation request. The master program 412 may then send the appropriate license back to the device.

Figure 5:
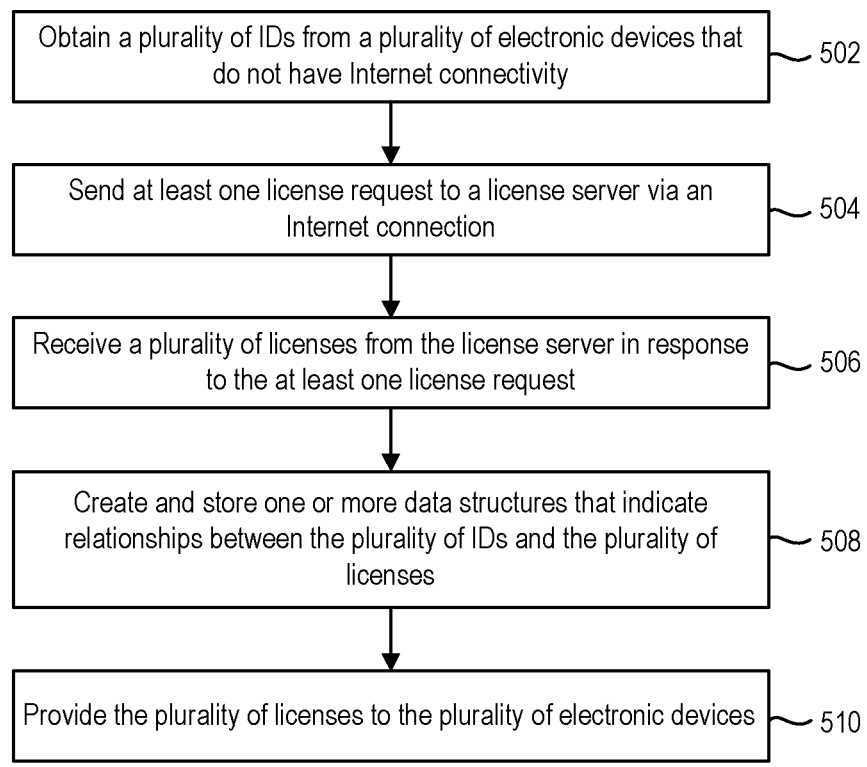
FIG. 5 is a flow diagram illustrating an example of a method for facilitating activation of a barcode decoder on a plurality of electronic devices that do not have Internet connectivity.

FIG. 5 is a flow diagram illustrating an example of a method 500 for facilitating activation of a barcode decoder on a plurality of electronic devices that do not have Internet connectivity. For the sake of clarity, the method 500 will be described in relation to one or more of the systems described previously. The method 500 may be performed by a computing device, such as the computing device 110 shown in FIGS. 1A-D, that includes a master program 112.

The method 500 may include obtaining 502 a plurality of IDs 118a-c from a plurality of electronic devices 102a-c that do not have Internet connectivity. Each of the plurality of electronic devices 102a-c may include a barcode decoder. Each of the plurality of IDs 118a-c may uniquely identify an electronic device.

The method 500 may also include sending 504 at least one license request (e.g., license requests 120a-c) to a license server 108 via an Internet connection. The at least one license request may include the plurality of IDs 118a-c.

The plurality of IDs 118a-c may be obtained 502 at different times. In some embodiments, the plurality of IDs 118a-c may be stored and sent 504 to the license server 108 as a group. Alternatively, a license request may be sent 504 to the license server 108 whenever an ID is received from an electronic device.

The method 500 may also include receiving 506 a plurality of licenses 122a-c from the license server 108 in response to the at least one license request. Each of the plurality of licenses 122a-c may enable operation of a barcode decoder or facilitate enhanced functionality for the barcode decoder.

The method 500 may also include creating and storing 508 one or more data structures (e.g., a table 126) that indicate relationships between the plurality of IDs 118a-c and the plurality of licenses 122a-c. The one or more data structures may be stored in storage 124 that is accessible to the computing device 110.

The method 500 may also include providing 510 the plurality of licenses 122a-c to the plurality of electronic devices 102a-c. For example, to provide 510 a particular license 122a to a particular electronic device 102a, the computing device 110 may receive a license activation request 128a from the electronic device 102a. The license activation request 128a may include an ID 118a that uniquely identifies the electronic device 102a. The computing device 110 may access one or more data structures (e.g., a table 126) that indicate relationships between the IDs 118a-c and the licenses 122a-c. The computing device 110 may identify, via the one or more data structures, a license 122a that corresponds to the ID 118a. The computing device 110 may provide the license 122a to the electronic device 102a.

In some embodiments, a computing device 310 may obtain 502 an ID 318 from an electronic device 302 by reading a first barcode 332 that is displayed on the electronic device 302. The computing device 310 may provide 510 a license 322 to the electronic device 302 by generating a second barcode 342 that comprises the license 322 and displaying the second barcode 342.

Figure 6:
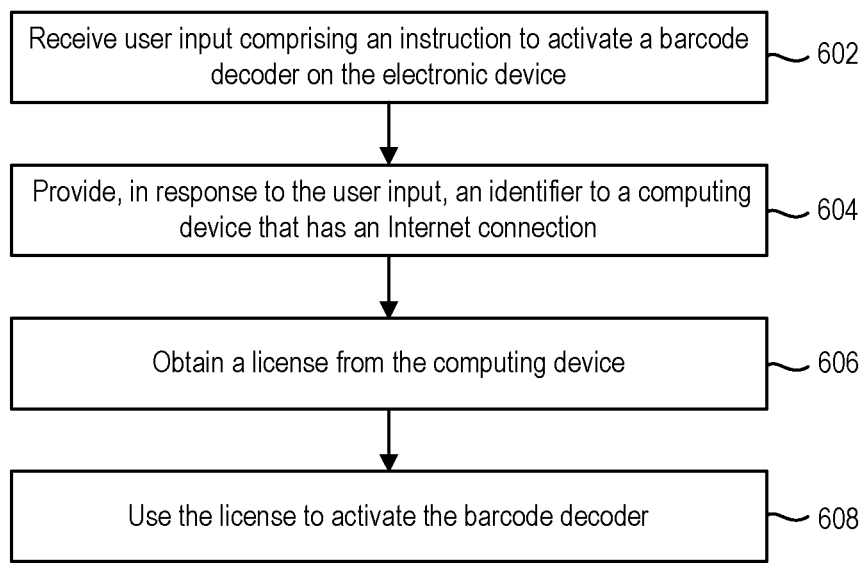
FIG. 6 is a flow diagram illustrating an example of a method for activating a barcode decoder on an electronic device that does not have Internet connectivity.

FIG. 6 is a flow diagram illustrating an example of a method 600 for activating a barcode decoder on an electronic device that does not have Internet connectivity. For the sake of clarity, the method 600 will be described in relation to one or more of the systems described previously. The method 600 may be performed by an electronic device, such as the electronic device 102a shown in FIGS. 1A-D.

The method 600 may include receiving 602 user input that includes an instruction to activate a barcode decoder 106a on the electronic device 102a. In response to the user input, the electronic device 102a may provide 604 an ID 118a to a computing device 110 that has an Internet connection. The ID 118a may uniquely identify the electronic device 102a.

In some embodiments, the user input may include first user input 154a that includes an instruction to provide an ID 118a to the computing device 110. The electronic device 102a may provide 604 the ID 118a to the computing device 110 in response to the first user input 154a.

The method 600 may also include obtaining 606 a license 122a from the computing device 110. Obtaining 606 the license 122a from the computing device 110 may include sending a license activation request 128a to the computing device 110. The license activation request 128a may include the ID 118a. In some embodiments, the user input that is received 602 includes second user input 152a that includes an instruction to obtain the license 122a for the barcode decoder 106a. The license 122a may be obtained 606 in response to the second user input 152a.

The method 600 may also include using 608 the license 122a to activate the barcode decoder 106a. Activating the barcode decoder 106a may include at least one of enabling operation of the barcode decoder 106a or facilitating enhanced functionality for the barcode decoder 106a.

In some embodiments, providing 604 an ID 318 to the computing device 310 may include generating a first barcode 332 that includes the ID 318 and displaying the first barcode 332. Obtaining 606 a license 322 from the computing device may include reading a second barcode 342 that is displayed on the computing device 310. The second barcode 342 may include the license 322.

Figure 7:
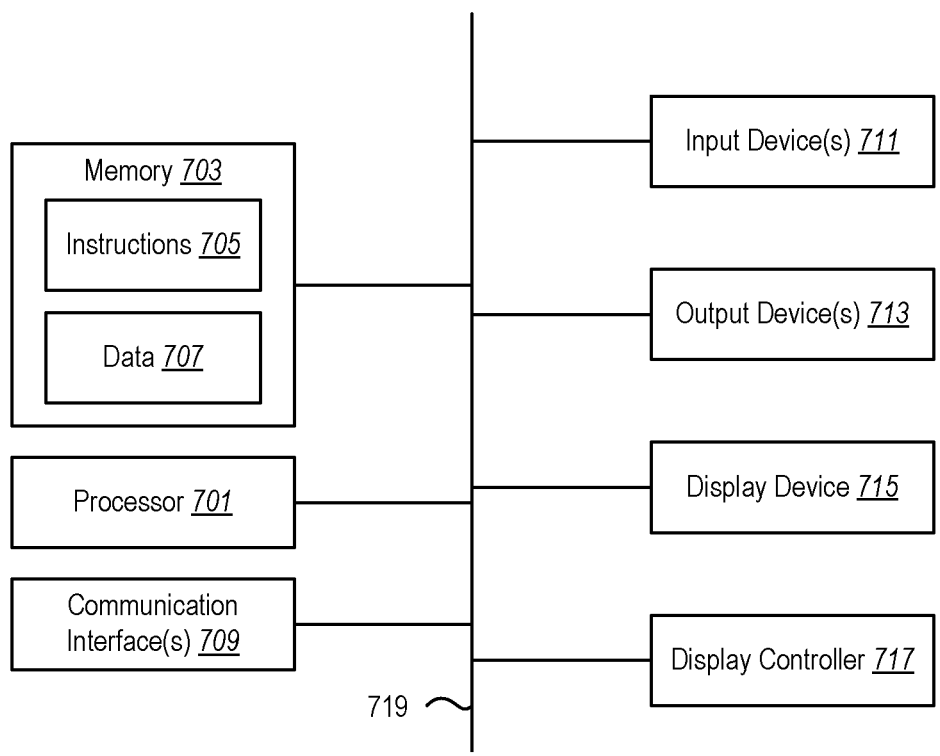
FIG. 7 illustrates certain components that may be included within a computer system.

FIG. 7 illustrates certain components that may be included within a computer system 700. One or more computer systems 700 may be used to implement the various devices, components, and systems described herein. For example, the various devices described herein (e.g., the computing devices 110a-c, 210, 310, 410 the electronic devices 102a-c, 202, 302, 402a-c) may include at least some of the components that are shown in the depicted computer system 700.

The computer system 700 includes a processor 701. The processor 701 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the steps, operations, actions, or other functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 702.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

The various components of the computer system 700 may be coupled together by one or more buses, which may include a power bus, a control signal bus, a status signal bus, a data bus, etc. For the sake of clarity, the various buses are illustrated in FIG. 7 as a bus system 719.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory computer-readable medium having computer-executable instructions stored thereon that, when executed by at least one processor, perform some or all of the steps, operations, actions, or other functionality disclosed herein. The instructions may be organized into routines, programs, objects, components, data structures, etc., which may perform particular tasks and/or implement particular data types, and which may be combined or distributed as desired in various embodiments.

The steps, operations, and/or actions of the methods described herein may be interchanged with one another without departing from the scope of the claims. In other words, unless a specific order of steps, operations, and/or actions is required for proper functioning of the method that is being described, the order and/or use of specific steps, operations, and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system, comprising:
    a plurality of electronic devices that do not have Internet connectivity, each electronic device comprising a barcode decoder and a license activation application;
    a computing device that has an Internet connection, the computing device comprising a master program that is executable to:
        obtain a plurality of identifiers from the plurality of electronic devices, wherein obtaining an identifier from an electronic device comprises reading a first barcode that is displayed on the electronic device;
        send at least one license request to a license server via the Internet connection, the at least one license request comprising the plurality of identifiers;
        receive a plurality of licenses from the license server in response to the at least one license request, each license among the plurality of licenses being associated with a particular electronic device; and
        provide the plurality of licenses to the plurality of electronic devices in response to receiving a plurality of license activation requests from a plurality of license activation applications on the plurality of electronic devices, wherein providing a license to the electronic device comprises generating a second barcode that comprises the license and displaying the second barcode.

2. The system of claim 1, wherein each license enables operation of the barcode decoder on an electronic device or facilitates enhanced functionality for the barcode decoder on the electronic device.

3. The system of claim 1, wherein:
    the plurality of identifiers are obtained at different times; and
    the master program is additionally configured to store the plurality of identifiers and send the plurality of identifiers to the license server together as a group.

4. The system of claim 1, wherein:
    the plurality of identifiers are obtained at different times; and
    the master program is additionally configured to send a license request to the license server whenever an identifier is received from an electronic device.

5. The system of claim 1, wherein the master program is additionally configured to:
    create one or more data structures that indicate, for each identifier among the plurality of identifiers, a license that is associated with the identifier; and
    store the one or more data structures in storage that is accessible to the computing device.

6. The system of claim 5, wherein the master program is additionally configured to:
    receive a license activation request from an electronic device, wherein the license activation request comprises an identifier that uniquely identifies the electronic device;
    access the one or more data structures;
    identify, via the one or more data structures, a license that corresponds to the identifier; and
    provide the license to the electronic device.

7. The system of claim 1, wherein the first barcode that is displayed on the electronic device is generated by the electronic device and displayed on a display screen of the electronic device.

8. A non-transitory computer-readable medium having computer-executable instructions stored thereon that, when executed, cause one or more processors on a computing device to perform operations comprising:
    obtaining a plurality of identifiers from a plurality of electronic devices that do not have Internet connectivity, wherein obtaining an identifier from an electronic device comprises reading a first barcode that is displayed on the electronic device;
    sending at least one license request to a license server via an Internet connection, the at least one license request comprising the plurality of identifiers;
    receiving a plurality of licenses from the license server in response to the at least one license request, each license among the plurality of licenses being associated with a particular electronic device; and
    providing the plurality of licenses to the plurality of electronic devices in response to receiving a plurality of license activation requests from a plurality of license activation applications on the plurality of electronic devices, wherein providing a license to the electronic device comprises generating a second barcode that comprises the license and displaying the second barcode.

9. The non-transitory computer-readable medium of claim 8, wherein:
    each electronic device comprises a barcode decoder; and
    each license enables operation of the barcode decoder or facilitates enhanced functionality for the barcode decoder.

10. The non-transitory computer-readable medium of claim 8, wherein each identifier uniquely identifies an electronic device.

11. The non-transitory computer-readable medium of claim 8, wherein:
    the plurality of identifiers are obtained at different times; and
    the operations further comprise storing the plurality of identifiers and sending the plurality of identifiers to the license server together as a group.

12. The non-transitory computer-readable medium of claim 8, wherein:

the plurality of identifiers are obtained at different times; and the operations further comprise sending a license request to the license server whenever an identifier is received from an electronic device.

13. The non-transitory computer-readable medium of claim 8, wherein the operations further comprise:

creating one or more data structures that indicate, for each identifier among the plurality of identifiers, a license that is associated with the identifier; and storing the one or more data structures in storage that is accessible to the computing device.

14. The non-transitory computer-readable medium of claim 13, wherein the operations further comprise:

receiving a license activation request from an electronic device, wherein the license activation request comprises an identifier that uniquely identifies the electronic device;

accessing the one or more data structures;

identifying, via the one or more data structures, a license that corresponds to the identifier; and providing the license to the electronic device.

15. The non-transitory computer-readable medium of claim 8, wherein the first barcode that is displayed on the electronic device is generated by the electronic device and displayed on a display screen of the electronic device.

16. A non-transitory computer-readable medium having computer-executable instructions stored thereon that, when executed, cause one or more processors on an electronic device that does not have Internet connectivity to perform operations comprising:

receiving user input comprising an instruction to activate a barcode decoder on the electronic device;

providing, in response to the user input, an identifier to a computing device that has an Internet connection, the identifier uniquely identifying the electronic device, wherein providing the identifier to the computing device comprises generating a first barcode that comprises the identifier and displaying the first barcode;

sending a license activation request to the computing device, the license activation request comprising the identifier;

receiving a license from the computing device in response to the license activation request, wherein receiving the license from the computing device comprises reading a second barcode that is displayed on the computing device, the second barcode comprising the license; and using the license to activate the barcode decoder.

17. The non-transitory computer-readable medium of claim 16, wherein activating the barcode decoder comprises at least one of enabling operation of the barcode decoder or facilitating enhanced functionality for the barcode decoder.

18. The non-transitory computer-readable medium of claim 16, wherein:

the user input comprises first user input comprising a first instruction to provide the identifier to the computing device and second user input comprising a second instruction to obtain the license for the barcode decoder;

the first barcode is generated and displayed in response to the first user input; and the license is obtained from the computing device in response to the second user input.

19. The non-transitory computer-readable medium of claim 16, wherein the first barcode is displayed on a display screen of the electronic device.

* * * * *